(12) United States Patent
Gunderman et al.

(10) Patent No.: US 6,895,712 B2
(45) Date of Patent: May 24, 2005

(54) WIRE CAGE FOR NURSERY ITEMS

(75) Inventors: John E. Gunderman, Inver Grove Heights, MN (US); Jerry E. Gunderman, South St. Paul, MN (US); John R. Gunderman, Inver Grove Heights, MN (US); George Wendell Hollenbeck, Hudson, FL (US)

(73) Assignee: Cherokee Manufacturing, Inc., St. Paul, MN (US)

( * ) Notice: Subject to any disclaimer, the term of this patent is extended or adjusted under 35 U.S.C. 154(b) by 137 days.

(21) Appl. No.: 09/930,917

(22) Filed: Aug. 16, 2001

(65) Prior Publication Data

US 2003/0033750 A1 Feb. 20, 2003

(51) Int. Cl.$^7$ ................................................ A47G 7/02
(52) U.S. Cl. .............................. 47/39; 47/45; 248/27.8; 248/156; 211/85.23
(58) Field of Search ................................ 47/45, 44, 47, 47/39; 248/27.8; 211/85.18, 85.21, 85.22, 85.23

(56) References Cited

U.S. PATENT DOCUMENTS

| | | | | |
|---|---|---|---|---|
| 1,359,026 A | * | 11/1920 | Briggs ........................ 248/27.8 |
| 1,536,678 A | * | 5/1925 | Markowski ..................... 47/47 |
| 1,889,670 A | * | 11/1932 | Knipe ...................... 211/85.23 |
| 1,925,927 A | * | 9/1933 | McKain ..................... 248/27.8 |
| 2,141,484 A | * | 12/1938 | Piglia ............................ 47/30 |
| 2,253,172 A | * | 8/1941 | Fetterman .............. 108/158.11 |
| 2,573,372 A | * | 10/1951 | Wagler ....................... 248/27.8 |
| 2,577,373 A | * | 12/1951 | Smith | |
| 2,673,053 A | * | 3/1954 | Kilian ......................... 248/153 |
| 2,839,202 A | * | 6/1958 | Arnett ........................ 211/106 |
| 3,013,758 A | * | 12/1961 | Smith ......................... 248/153 |
| 3,148,850 A | * | 9/1964 | Johnson ..................... 248/27.8 |
| 3,397,485 A | * | 8/1968 | Peterson | |
| 3,432,136 A | * | 3/1969 | Panney ........................ 248/315 |
| 3,793,771 A | * | 2/1974 | Slaughter ....................... 47/44 |
| 4,019,280 A | * | 4/1977 | Summers ........................ 47/45 |
| 4,747,494 A | * | 5/1988 | Tyson ....................... 211/133.4 |
| 4,914,857 A | * | 4/1990 | Dodge ........................... 47/47 |
| 5,050,339 A | * | 9/1991 | Howell ........................... 47/39 |
| 5,179,799 A | * | 1/1993 | Hillestad ........................ 47/45 |
| D359,929 S | * | 7/1995 | Thornhill ................... D11/143 |
| 5,640,802 A | * | 6/1997 | Elliott ........................... 47/45 |
| 5,784,972 A | * | 7/1998 | Emalfarb et al. ........... 108/156 |
| 5,810,181 A | * | 9/1998 | Emalfarb et al. ........ 211/129.1 |
| 5,893,469 A | * | 4/1999 | Nozawa ................... 211/71.01 |
| 6,119,393 A | * | 9/2000 | Wourms et al. ................ 47/39 |
| 6,349,502 B1 | * | 2/2002 | Fernandez ...................... 47/45 |
| 2002/0029518 A1 | * | 3/2002 | Peck ............................. 47/45 |
| 2003/0033750 A1 | * | 2/2003 | Gunderman et al. ........... 47/45 |
| 2003/0066233 A1 | * | 4/2003 | Gunderman et al. ........... 47/45 |

FOREIGN PATENT DOCUMENTS

| | | | |
|---|---|---|---|
| EP | 0639343 A1 | * | 2/1995 |
| FR | 2614774 A1 | * | 11/1988 |
| FR | 2664483 A1 | * | 1/1992 |
| FR | 2775755 A1 | * | 9/1999 |
| JP | 8-38323 | * | 2/1996 |
| JP | 11-192019 | * | 7/1999 |

* cited by examiner

Primary Examiner—Jeffrey L. Gellner
(74) Attorney, Agent, or Firm—Oppenheimer Wolff & Donnelly LLP

(57) ABSTRACT

A wire plant cage comprises a matrix of interconnected vertical and horizontal wire members to support a plant and to accommodate plant growth. The wire plant cage has an upper ring and lower ring connected to at least one leg adapted to provide support for the wire plant cage and engage the ground. A ledge, shaped so as to permit application of a downward force by a plant cage user, is formed on each leg to facilitate ground engagement without damage to the ring-leg connections. Loops formed on the top of the legs provide a mechanism for pulling the plant cage out of the ground and handling the cage. The plant cage is shaped so as to provide support to plants growing out of the ground and to support plant containers that are placed within the plant cage interior. The present invention is shaped to facilitate the stacking of a plurality of the plant cages for storage.

10 Claims, 9 Drawing Sheets

WIRE CAGE FOR NURSERY ITEMS

BACKGROUND OF THE INVENTION

1. Field of the Invention

This invention relates generally to cages for protecting and supporting plants. More particularly the present invention relates to an inexpensive multi-purpose structure that operates as a plant cage and a support for plant containers.

2. Background of the Invention

Many different devices are used to help plants through their different stages of development. To prevent plants from dying, they must be protected to minimize damage from harsh environmental conditions. As the plant continues to grow it is necessary to support the branches or vines of the plant as they extend above the ground to maximize plant exposure to sun or water. In the culturing and development of potted plants or plants resident in some type of container, many times a stand or support is used to position the potted plant off of the ground or floor. Stand users, such as gardeners and nursery operators, use the stand to facilitate moving plants and optimize the use of storage or floor space.

To prevent having to buy and install different support structures for plants in containers and plants in the ground, it would be advantageous to use the same structure for both a cage for hanging plant limbs, vines, branches, and the like, and a support for a plant container. Most structures, however, cannot perform both functions. In addition, the most effective structure for a plant container stand is not necessarily the most effective structure for supporting plant limbs.

Prior plant cages commonly use wire to support plant branches and vines. The prior structures comprise wire sections welded together that tend to be very unstable. The structures are lightweight which makes them easy to blow over in inclement weather or easy to knock over by a person passing by the structure. The legs of the structures typically are single extensions of wire that are to be fixed to the ground by pushing the structure downward, forcing the legs into the ground. Often the processes of fixing the wire structure to the ground and removing from the ground are difficult. The wire structures frequently deform, or, even worse, the welds holding the wire structure together break, during the application of downward force to fix the structure to the ground, and when the wire structure is pulled from the ground.

Additionally, prior plant cages have experienced problems due to their shape and structural orientation. For example, many plant cages have insufficient space at the top of the cage to permit additional plant growth. Some segments of wire plant cages slope downwardly, causing branches of a plant to slide down on top one another, which prevents maximum exposure of the plant foliage to sun and rain. Finally, the shape of some plant cages is disadvantageous to stacking of multiple of the plant cages on top of one another. There may be a segment or portion of the plant cage that prevents multiple plant cages to complementarily engage one another in a stacking fashion.

On the other hand, many prior plant container support structures are inverted cone-shaped wire structures. The wire structures are made of lightweight wire sections that are welded together. The bottom of the plant container support has a smaller diameter than the top of the container, which is more likely to cause the support to be blown over or accidentally tipped. Thus, the legs of the container support had to be made out of a heavier gauge wire to provide more support to the plant container. The use of heavier gauge wire increases production costs. The inverted cone-shape of the container support structure limits the variety of sizes and shapes of containers that are capable of being positioned into the support structure. The limitation of admissible containers requires the user to purchase an additional container supports of varying sizes.

Moreover, having two separate structures, i.e., the plant cage and the plant container support, increases the cost of equipment for a user, and, increases the chances of losing a structure when not in use.

As such, it may be appreciated that there continues to be a need for a plant cage dimensioned to allow maximum exposure of a plant to sun and rain while maintaining a high degree of stability to not be blown over or destroyed by wind and other conditions. There is a desire to provide a plant container support designed to effectively accommodate various sized containers and provides sturdy reliable support. Additionally, there is a need to provide a rigid plant cage that can withstand the rugged handling associated with repeated insertion and removal from the ground.

The decision made by a gardener whether to place a plant in the ground or place the plant in a container may change from time to time. Accordingly, a need exists for a low cost device that provides the dual function of plant cage and plant container support while providing the maximum support and best possible growing environment for a plant.

SUMMARY OF THE INVENTION

It is an object of the present invention to provide a unitary structure operating as both a support for holding the branches of a plant above the ground in a fashion that maximizes the plants growth capacity, and as a support structure for holding potted plants in an above-ground configuration.

Another object of the invention is to minimize the cost to ship and to minimize the amount of space needed to store a plant cage.

Another object of the invention is to provide a plant cage that is easy to insert and remove from ground engagement without causing damage to the connection of wire components of the plant cage.

An embodiment of the present invention comprises an upper ring and a lower ring. At least one leg is attached to the upper ring and lower ring, and extends below the rings. The legs fix the upper and lower rings in a parallel, vertically spaced, horizontally disposed orientation such that the upper and lower rings are centered about a vertical axis. The lower ring has a larger diameter than the upper ring. The legs are adapted to support the upper ring and lower ring, and engage the ground. Each component of the plant cage may be made of galvanized wire or plastic and rigidly attached to one another.

Each leg is an elongate U-shaped member comprising a closed end, and an open end defined by the two extended portions of the U. The leg is attached to the upper ring such that the closed end of the U-shaped leg member is located proximate the upper ring so as to define a loop formed above the upper ring. The two portions of the open end of the U-shaped member form the base of the leg and are adapted to be embedded in the ground or rest on a floor.

Each leg comprises a ledge to facilitate application of a downward force by a user to secure the plant cage to the ground. The ledge is defined by a bend in each of the two extended portions of the U-shaped member. The ledge is located below the attachment position of the lower ring to the leg.

The rings are shaped so as to define an inner volume of the plant cage. The inner volume of the plant cage provides an enclosure for a plant growing out of the ground, and supports its branches and vines. Additionally, the inner volume accommodates the insertion of a plant container housing a plant. The plant container is adapted rest on the upper ring and loops of the legs so as to position the plant container above the ground.

When the wire cage is used as a supporting structure for plants, the cage is secured to the ground by inserting the legs into the ground via a downward force applied to the ledge, and/or the loop, of at least one of the legs. This method of insertion avoids causing damage to leg-to-ring connections of the wire cage and prevents deformation of the cage. To remove the cage from ground engagement, a user simply pulls up on at least one of the loops.

When the wire cage is used as a support for a plant container, the cage is positioned on the floor or secured to the ground. A plant container, housing a plant, is inserted into the interior volume of the wire cage such that at least a rim or lip of the container engages the upper ring and loop of the leg for support of the plant container in the plant cage.

The present invention has multiple applications, including, but not limited to the following. The wire cage may be used as a tomato cage; a support for growing plants in containers, and providing a simple way move the plants; a support for limbs and branches of growing plants, to prevent damage to the plant; and as a plant or wreath support in a cemetery. No changes are required for the wire cage structure to be used in any of the above-indicated operations.

The present invention provides a more stable plant cage since each leg has a ledge and a loop to handle the plant cage, during securement of the plant cage to the ground and removal of the cage. This minimizes the negative affect on the connections of the upper and lower rings, and legs. A reduced impact on the connections of the plant cage prolongs the operational life of the cage.

In an alternative embodiment of the present invention, elongate legs are provided with a loop at the upper end and a single portion at the opposite end for engaging the ground.

The foregoing and other objects, features and advantages of the invention will become more readily apparent from the following detailed description of a preferred embodiment of the invention that proceeds with reference to the accompanying drawings.

DETAILED DESCRIPTION OF PREFERRED EMBODIMENTS

Various embodiments of the present invention are shown and described to support plants and plant containers. It is to be understood that though these embodiments are shown and described in isolation, various features of each embodiment can be combined with the others to produce a variety of embodiments.

Figure 1:
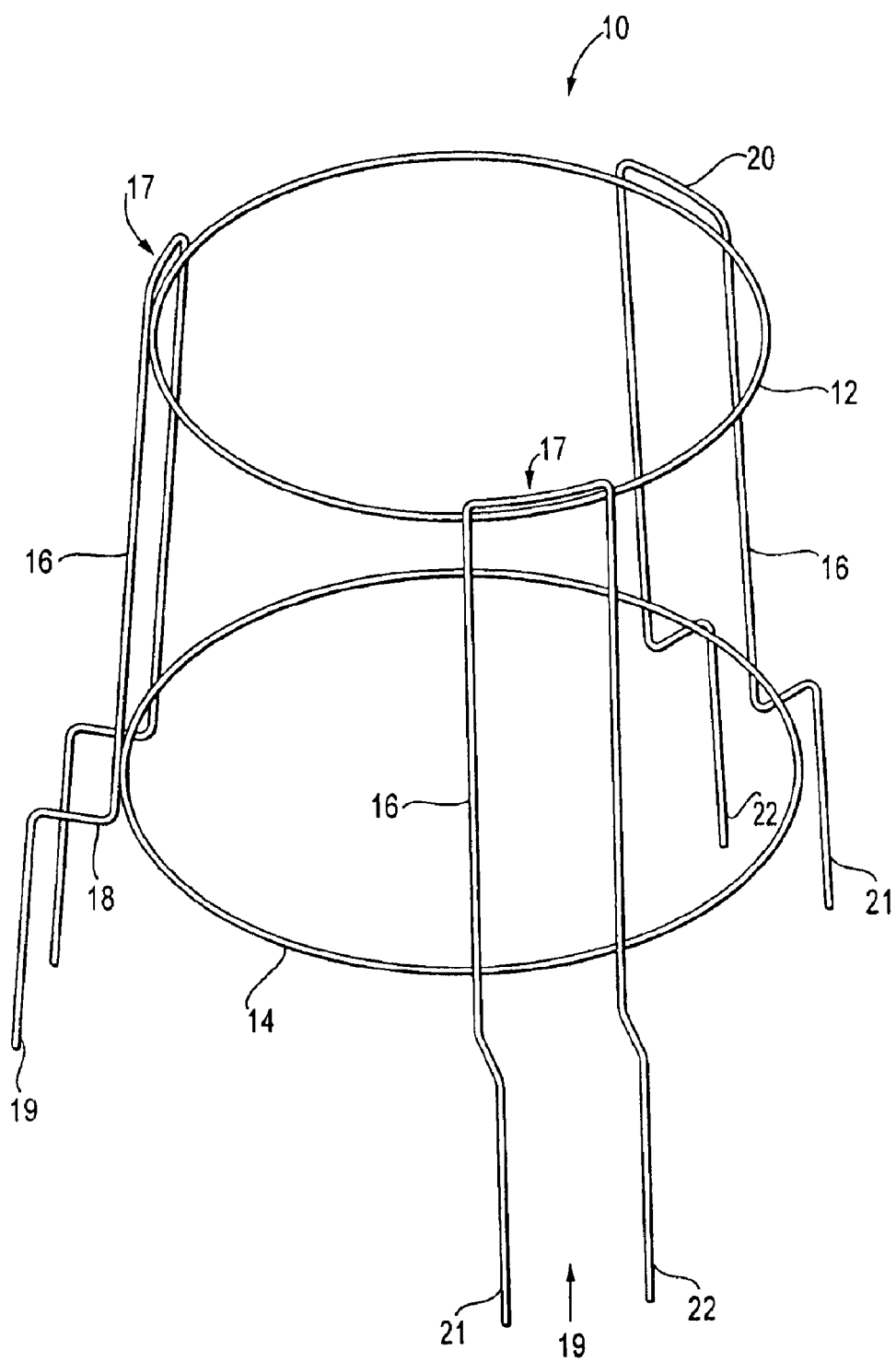
FIG. 1 perspective view of an embodiment of the present invention.
Figure 3:
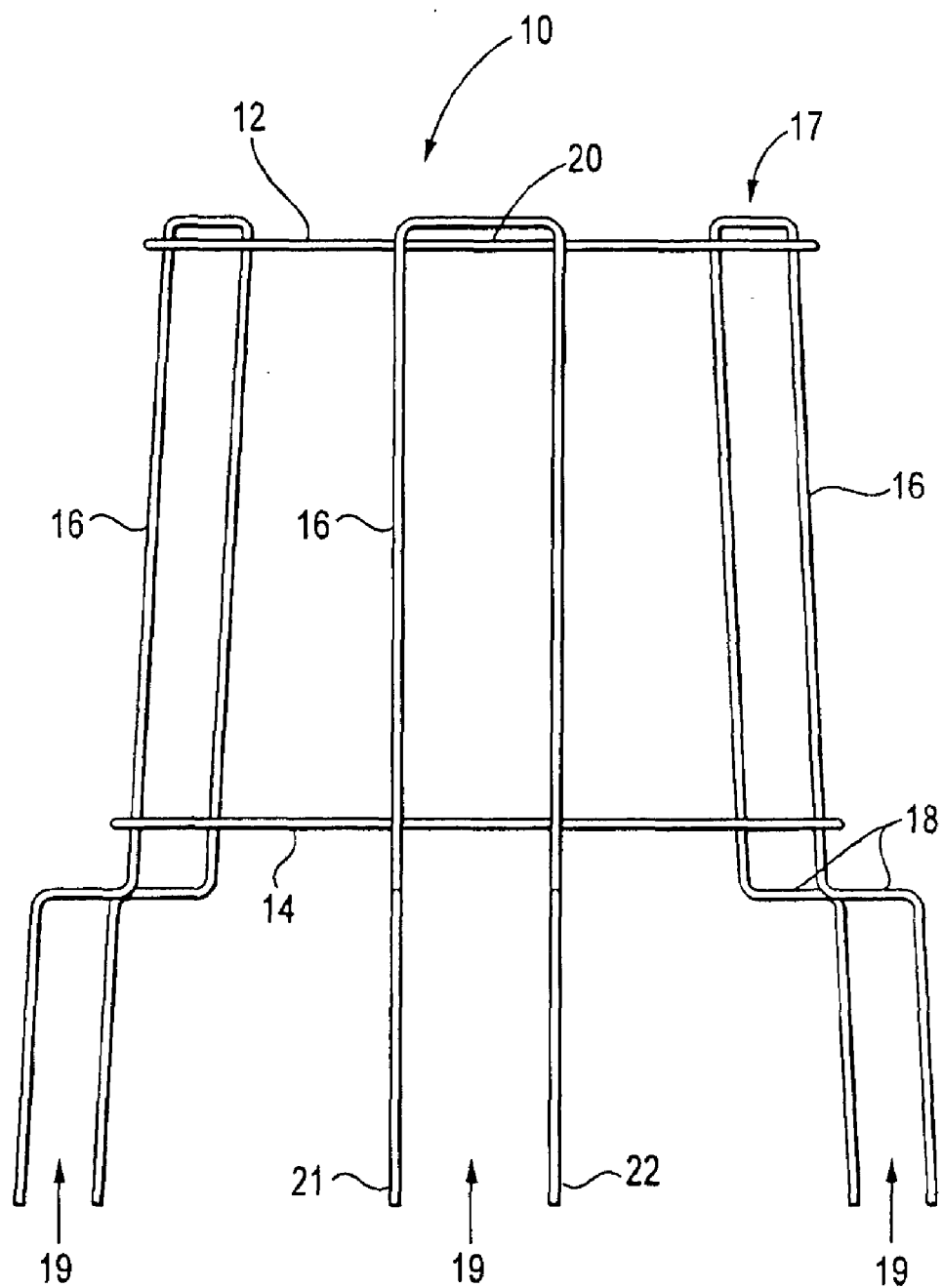
FIG. 3 is a side view of the embodiment of FIG. 1.

Referring to FIGS. 1 and 3, a first embodiment of a wire plant cage is shown and generally referred to as 10. The wire cage comprises an upper ring 12 and a lower ring 14. A plurality of legs 16 are attached to the upper ring 12 and lower ring 14, and extend beneath the lower ring 14. As shown in FIG. 1, three legs 16 fix the upper ring 12 and the lower ring 14 in a parallel, vertically spaced, horizontally disposed orientation such that the upper 12 and lower 14 rings are centered about a vertical axis. The legs 16 are adapted to support the upper ring 12 and lower ring 14, and engage the ground.

Figure 9:
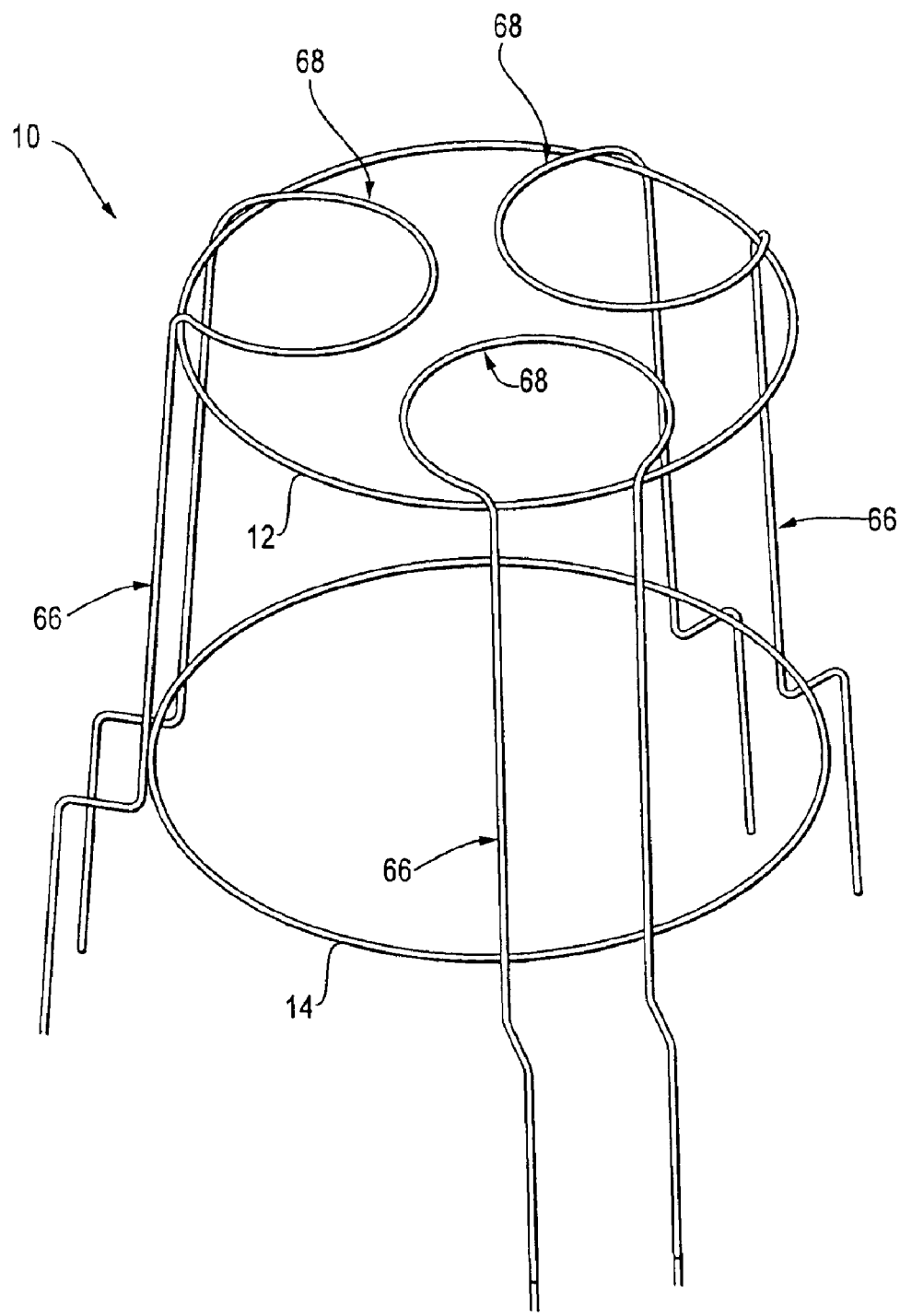
FIG. 9 is a perspective view of an alternative embodiment of the leg of the present invention.

The leg 16 is an elongate U-shaped member comprising a closed end 17, and an open end 19 defined by the two extended portions 21 and 22 of the U. As shown in FIG. 1, the leg 16 is attached to the upper ring 12 in such a manner that a portion of the closed end 17 of the U-shaped leg 16 extends above the upper ring 12 so as to define a loop 20 formed above the upper ring 12. The loop 20 provides a location for a plant cage use to comfortably handle the cage 10, avoiding injury to users' hands or damage to the cage 10 itself (as will be described in more detail hereinbelow). The open of each loop 20 is of sufficient size to enable a user to comfortably grip the loop 20. The leg 16 may have any number of loops 20, or the loop 20 may be of any shape desired to perform described function. For example, as shown in FIG. 9, leg 66 is a double leg member with a loop 68 that is formed by a bend in the upper portions of the leg 16. The loop 68 is formed substantially in a different plane, i.e., perpendicular, than the plane created by the upper portions of leg 16.

The two portions 21 and 22 of the open end 19 form the base of the leg 16 and are adapted to be embedded in the ground, or rest on a floor. The "double" leg 16 provides a more stable base for the cage 10, when positioned either in the ground or on a hard surface, such as a floor.

Each leg 16 has a ledge 18 formed thereon to facilitate the application of a downward force, by a cage user, to secure the plant cage 10 to the ground. The ledge 18 is defined by a bend, projecting radially outwardly from the central axis of the cage 10, formed in each of the two extended portions 21 and 22 of the open end 19 of the U-shaped leg 16. Preferably, the ledge 18 is located below the attachment position of the lower ring 14 to the leg 16. The location of the ledge 18 on leg 16 provides the ability to easily embed the cage 10 into the ground. A user simply places a foot on the ledge 18 and applies a downward force, urging the leg 16 into the ground (as will be described in detail hereinbelow). The ledge 18 is of sufficient size to accommodate a user foot. The bend forming the ledge 18 may be formed at any angle relative to major axis of the leg 16 desired, for example 90 degrees. However, the angle of the bend must enable a user to easily apply enough downward force to secure the cage 10.

The plant cage 10 may be made of a wire material, such as metal, or a plastic. Preferably a galvanized metal, such as steel, or, extruded plastic or coat plastic is used for the components of the wire cage 10. These materials are preferred to prevent acids and alkalies in the ground and soil from wasting or degrading components of the wire cage 10.

The components forming the cage 10, upper ring 12, lower ring 14 and legs 16, are rigidly attached to one another. This rigid attachment may be achieved by several methods, such as welding, soldering, applying epoxy, and wrapping. Wrapping is a process applied during the construction of the cage 10 wherein one wire component, such as a leg 16, is fixed to another wire component, ring 12, by bending a portion of the leg 16 around the ring 12. With the process of wrapping, no other bonding agent is required to fix one component to another.

Figure 2:
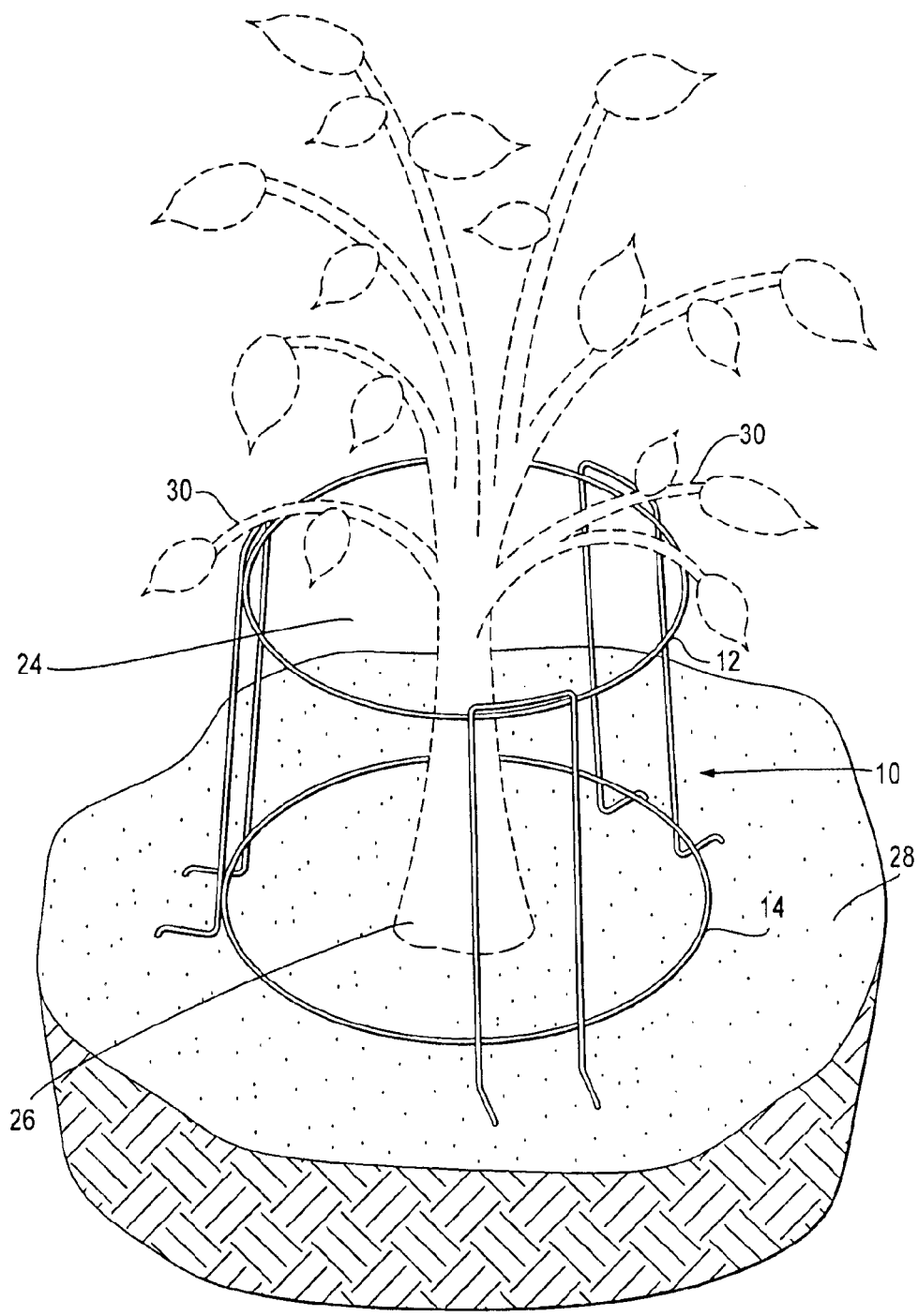
FIG. 2 perspective view of the embodiment of FIG. 1 with the cage inserted into the ground surrounding a plant.

Referring to FIG. 2, the upper 12 and lower 14 rings are shaped so as to define an inner volume 24 of the plant cage 10. The inner volume 24 of the plant cage 10 provides an enclosure area for a plant 26 to grow out of the ground 28, and supports plant branches and vines 30. Specifically, the upper 12 and lower 14 rings provide support for extending branches and vines 30 of the plant 26 to facilitate the plant's exposure to sunlight and water. Alternatively, additional rings may be disposed between the upper 12 and lower 14 rings to provide additional support areas for branches and vines 30, as well as provide more stability to the plant cage 10.

Figure 6:
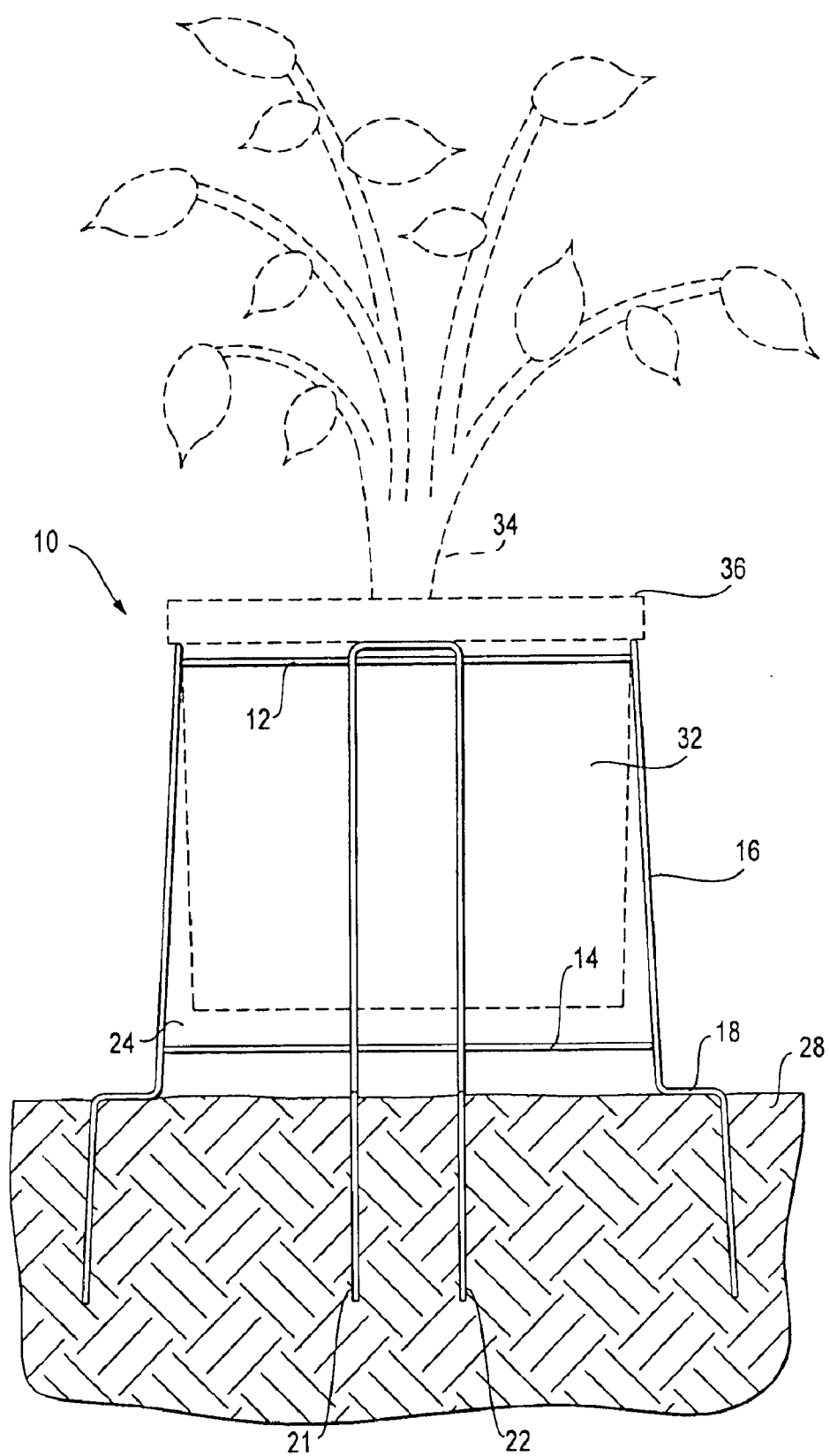
FIG. 6 is a side view of the embodiment of FIG. 1 with a potted plant disposed within the cage.

Referring to FIG. 6, the inner volume 24 of the first embodiment of the present invention accommodates the insertion of a plant container or pot 32 housing a plant 34. The plant container 32 is adapted rest on the upper ring 12 and loops 20 of the legs 16 so as to securely hold the plant container 32 off of the ground 28. Having the plant container 32 raised above the ground has several benefits. First, the cage 10 can better enable a user to properly position the plant 34 to receive light and water. Second, the cage 10 enables a user to make more efficient use of limited space in a garden or nursery, or where plants may tend to crowd each other. Finally, the cage 10 maintains a plant in a predetermined position, resisting tipping over by external forces while enabling a user to easily pick up and move a plant. The plant container 32 is simply lifted out of the cage 10 and moved to another location.

Figure 8:
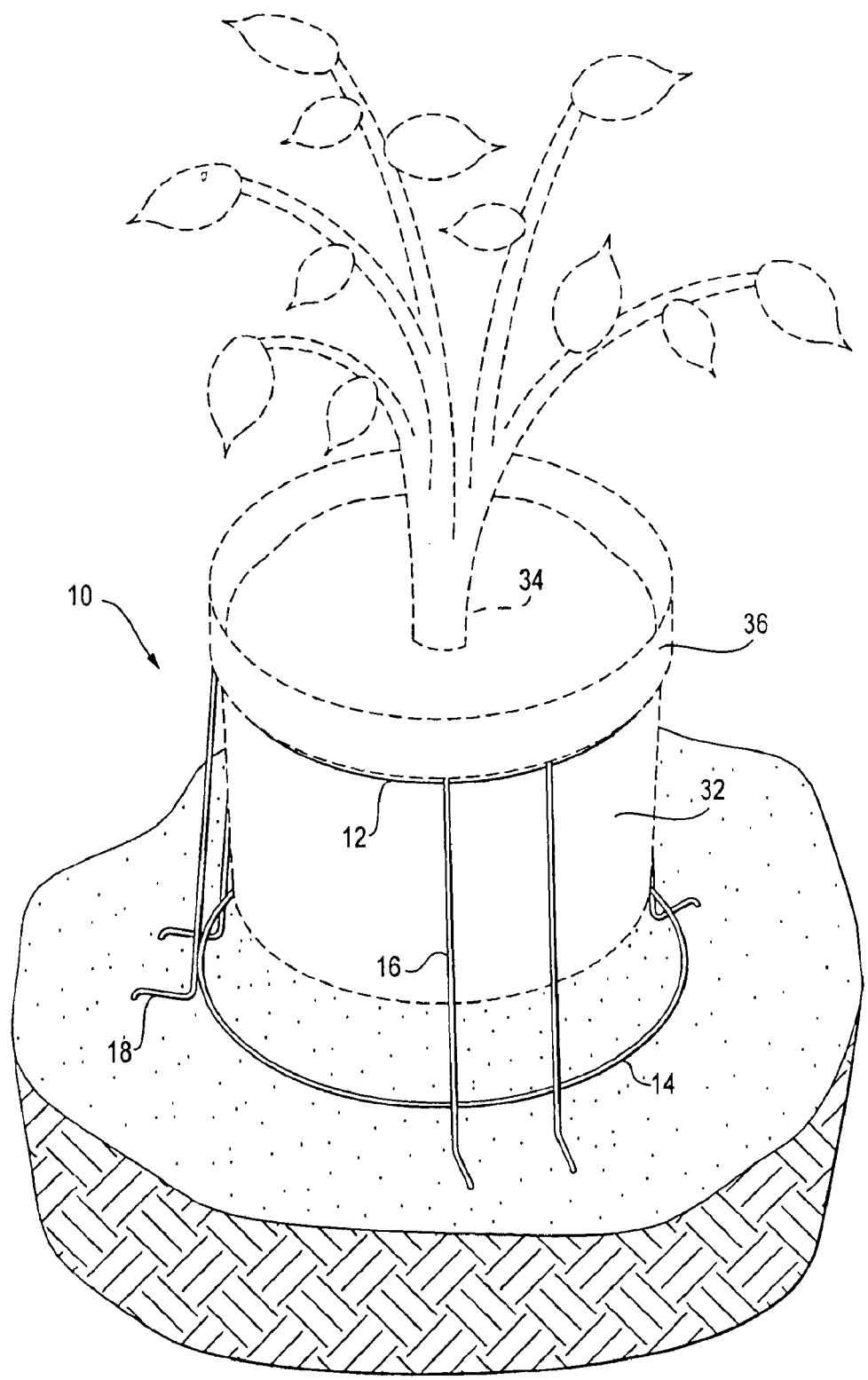
FIG. 8 is a side view of the embodiment of FIG. 1 with a potted plant disposed within the cage, the upper rim of the potted plant resting on the upper ring.

The plant containers 32 preferably have a lip or rim 36 to facilitate the proper positioning of a container within the inner volume 24 of the cage 10. Specifically, the rim 36 of container 32 is adapted to rest over the loops 20 of legs 16. Alternatively, the plant container may rest over loops 20 of legs 16, having the rim 36 cover the upper ring 12, as shown in FIG. 8.

The lower ring 14 has a larger diameter than the upper ring 12. See FIG. 6. The difference in diameter provides the ability to insertion of varying sizes and shapes of containers 32 into inner volume 24. This is beneficial because a cage user will not be required to obtain a large number of different sized cages 10 to accommodate various containers 32.

When the wire cage 10 is used as a supporting structure for plants, the cage 10 is secured to the ground by inserting the legs 16 into the ground 28 via a downward force applied to the ledge, 18 and/or the loop 20, of at least one of the legs 16. See FIG. 2. This method of insertion avoids causing damage to leg 16 to ring 12 and 14 connections of the wire cage. This method prevents degradation of a weld, epoxy, solder, or wrapped connection that may lead deformation of the cage 10. To remove the cage 10 from ground 28 engagement, a user simply pulls up on at least one of the loops 20 until the ends of the legs exit the ground.

When the wire cage 10 is used as a support for a plant container, the cage 10 is positioned on the floor or secured to the ground 28, as shown in FIG. 6. A plant container 32, housing a plant 34, is inserted into the interior volume 24 of the wire cage 10 in such a manner that a portion, i.e., a rim or lip 36, of the container 32 rests on the upper ring 12 and loop 20.

Figure 4:
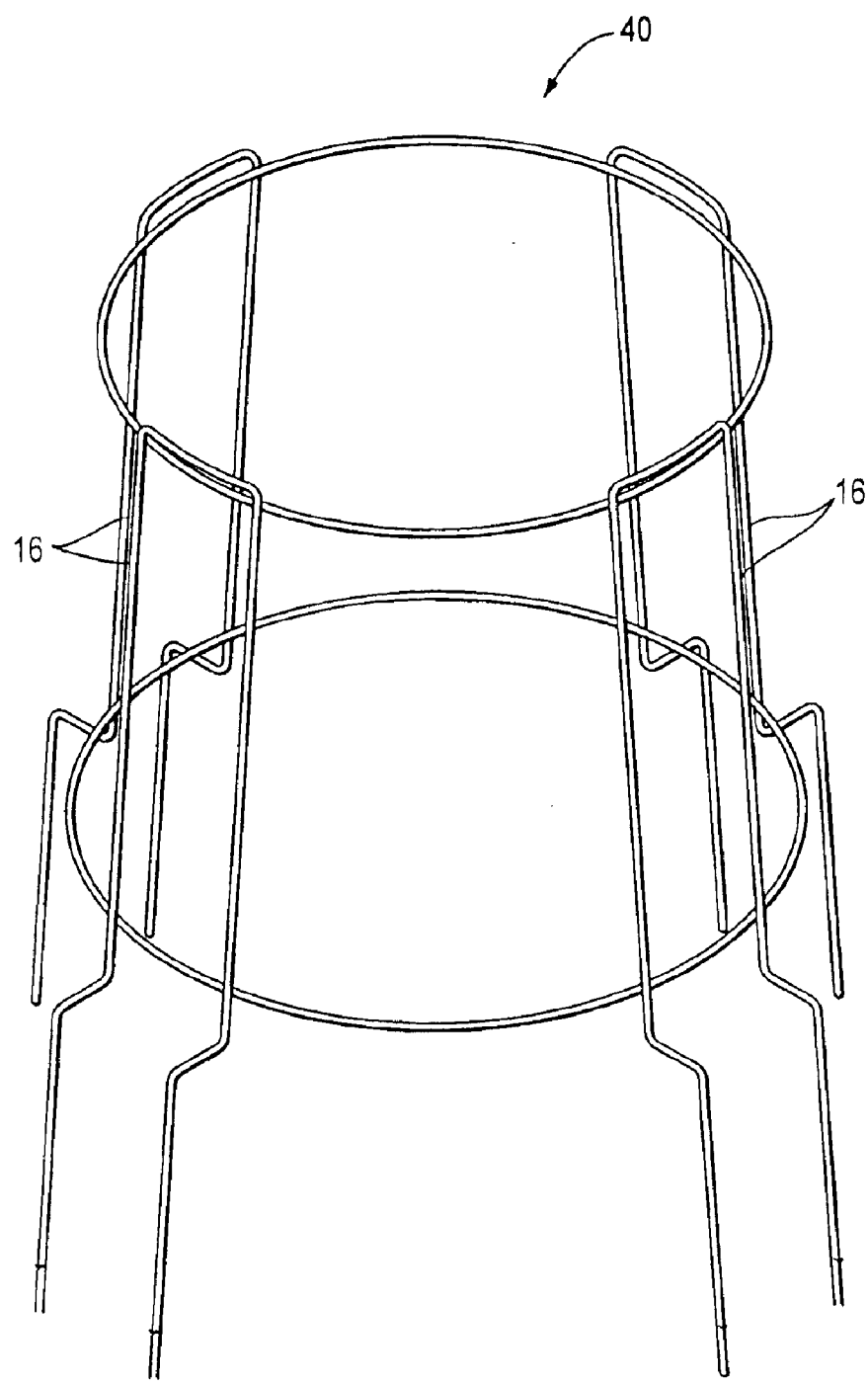
FIG. 4 is a perspective view of an alternative embodiment of the present invention.
Figure 5:
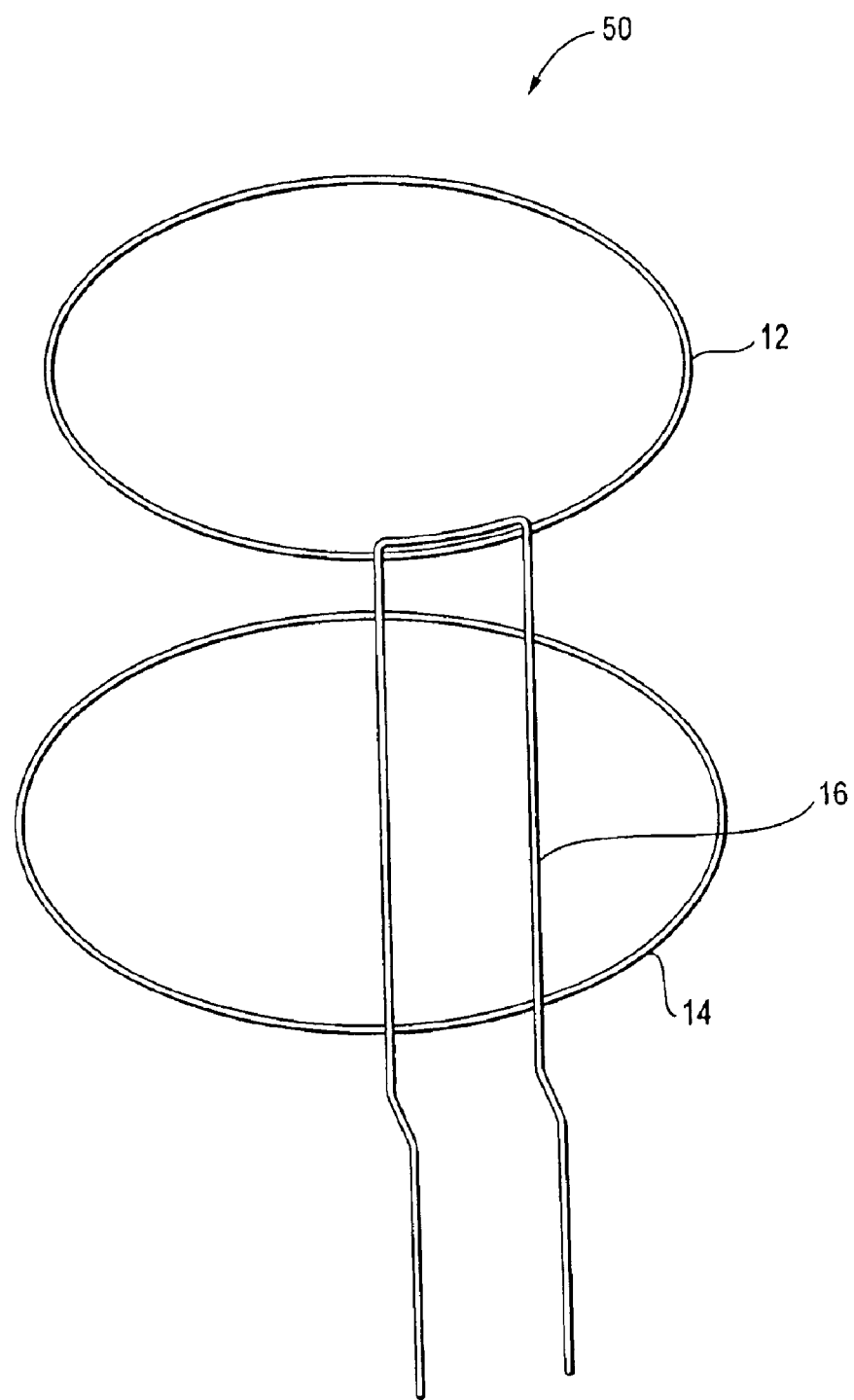
FIG. 5 is a perspective view of another embodiment of the present invention.

Shown in FIGS. 4 and 5 are alternative embodiments of the present invention. FIG. 4 shows a wire cage 40 with four elongate legs 16 attached to an upper ring 12 and a lower ring 14. FIG. 5 shows a wire cage 50 a single leg 16 attached to an upper ring 12 and a lower ring 14. These embodiments demonstrate that varying numbers of legs 16 may be provided to the wire cage. A larger number of legs 16 will provide more stability to the cage to better enable the cage support heavier loads.

Figure 7:
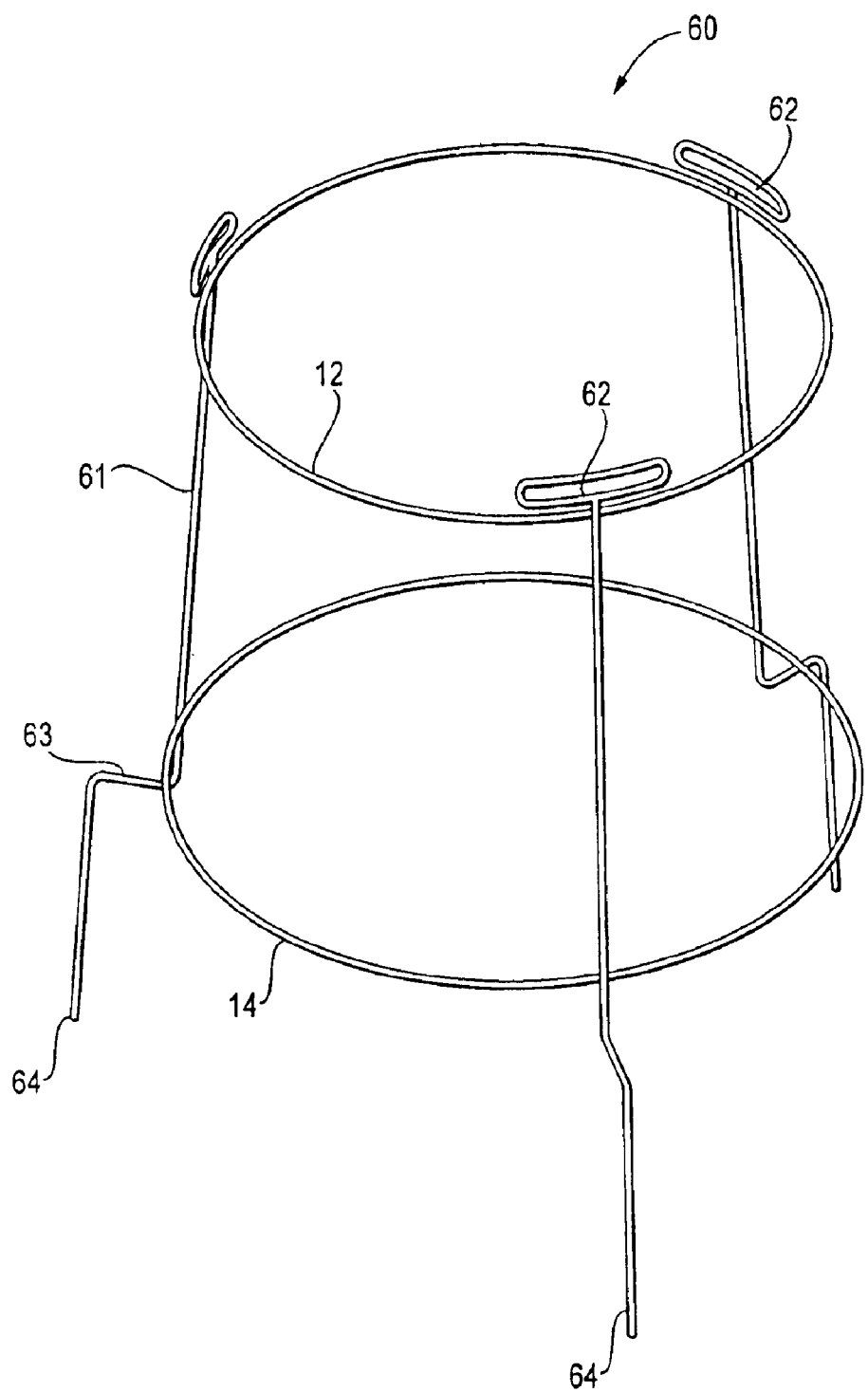
FIG. 7 is a perspective view of an alternative embodiment of the present invention with a single wire legs.

Shown in FIG. 7 is an alternative embodiment of the present invention. A wire cage 60 comprises an upper ring 12 and a lower ring 14 supported by a plurality of legs 61. Each leg is a "single" elongated member having a loop 62 at a first end and a second end 64. The loop 62 performs the same function as the loop 16 described above. The second end 64 is adapted to engage the ground and secure the wire cage 60. A ledge 63 is formed by a bend in each leg 64, in the same manner as ledge 18 described above.

Additionally, the present invention may be formed in varying sizes and dimensions to provide support for different sizes of plants and plant containers.

The present invention provides a more stable plant cage since each leg has a ledge and a loop to handle the plant cage, during securement of the plant cage to the ground and removal of the cage. This minimizes the negative affect on the connections of the upper and lower rings, and legs. A reduced impact on the connections of the plant cage prolong the operational life of the cage.

The shape of the present invention, as shown in the Figures, lends itself to easy stacking of a plurality of cages. The ability to stack a plurality of the cages enables a user to make efficient use of storage space.

While the present invention has been described with respect to a plant support and container support, likewise, many other applications exist within the field of gardening and nursery devices in general. The present invention may be used as a tomato cage to support the vines of the tomato plant. The present invention may rigidly support plants growing in containers in an above ground orientation. Alternatively, the present invention may provide support for flowers, plants or wreathes placed in a cemetery. No changes are required for the wire cage 10 be used in any of the above-indicated operations.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments that have been described in detail therein. Rather, reference should be made to the appended claims as indicative of the scope and content of the present invention.

What is claimed is:

1. A stackable container stabilizer comprising:
   an upper ring;
   a lower ring having a larger diameter than the upper ring;
   at least one leg attached to the upper ring and lower ring, the at least one leg adapted to support the upper ring and lower ring and engage the ground, the at least one leg comprising a ledge shaped so as to permit application of a downward force by a plant support user to insert a portion of the plant support into the ground, the ledge defined by a bend in said at least one leg, the ledge located below the position where the lower ring attaches to the at least one leg;

wherein said at least one leg is an elongated U-shaped member comprising a closed end and an open end defined by two portions of the U-shaped member;

the upper ring is attached to said at least one leg proximate the closed end such that a loop is formed above the upper ring by the closed end of the at least one leg;

the ends of the two portions of the U-shaped member are adapted to engage the ground; and the container stabilizer shaped to enclose plants and support plant containers by inserting a plant container into the interior volume of the wire structure, wherein the plant container is supported above the ground by the wire structure.

2. The stackable container stabilizer of claim 1 wherein at least one ring is located between the upper ring and lower ring and attached to said at least one leg.

3. The stackable container stabilizer of claim 1 wherein the plant support is made of wire.

4. The stackable container stabilizer of claim 3 wherein the at least one leg is attached to the upper ring and lower ring by any one of the group consisting of weld, solder, wrap, and epoxy.

5. The stackable container stabilizer of claim 3 wherein the wire is made of a galvanized metal.

6. The stackable container stabilizer of claim 1 wherein the plant support is made of plastic.

7. The stackable container stabilizer of claim 1 wherein the ledge is defined by a bend in the two portions of the U-shaped member.

8. The stackable container stabilizer of claim 1 wherein the upper ring and lower ring are shaped so as to permit insertion of a plant container within the plant support, and upper ring adapted to engage a portion of the plant container.

9. A method for using a wire structure as both a supporting structure for plants and plant containers comprising:

providing a wire structure centered about a vertical axis, the wire structure having: at least two parallel rings vertically spaced and horizontally disposed connected to at least two U-shaped legs extending downwardly from said rings, the wire structure defining an interior volume; a ledge formed on at least one of said legs for securement of the wire structure; and at least one loop formed by the connection of one of said legs and one of said rings for removal and transport of the wire structure;

wherein the at least two rings include an upper ring and a lower ring, the lower ring having a larger diameter than the upper ring, the upper and lower ring shaped so as to facilitate the stacking of a plurality of wire structures, and to accommodate the insertion of a plant container within the structure, the upper ring engaging a portion of the plant container;

inserting the legs into the ground for using the wire structure as a support for plants, wherein a downward force is applied to the ledge by a wire structure user to insert the legs into the ground without causing damage to leg-to-ring connections of the wire structure;

pulling up on said at least one loop to remove and transport the wire structure when the wire structure is not in use; and inserting a plant container into the interior volume of the wire structure, wherein the plant container is supported above the ground by the wire structure.

10. The method according to claim 9 further comprising inserting the legs into the ground for using the wire structure as a support for plants, wherein a downward force is applied to the ledge and said at least one loop by a wire structure user to insert the legs into the ground without causing damage to leg-to-ring connections of the wire structure.

* * * * *

UNITED STATES PATENT AND TRADEMARK OFFICE
CERTIFICATE OF CORRECTION

PATENT NO. : 6,895,712 B2
DATED : May 24, 2005
INVENTOR(S) : Gunderman et al.

It is certified that error appears in the above-identified patent and that said Letters Patent is hereby corrected as shown below:

<u>Title page,</u>
Item [54], Title, delete "WIRE CAGE FOR NURSERY ITEMS" and insert
-- IN-GROUND CONTAINER STABLIZER FOR NURSERY ITEMS --.

Signed and Sealed this

Second Day of August, 2005

JON W. DUDAS
*Director of the United States Patent and Trademark Office*